April 8, 1958
F. H. CAREY
2,829,662
APPARATUS FOR REGULATING FUEL FLOW
IN GAS TURBINE ENGINES
Filed Sept. 6, 1955
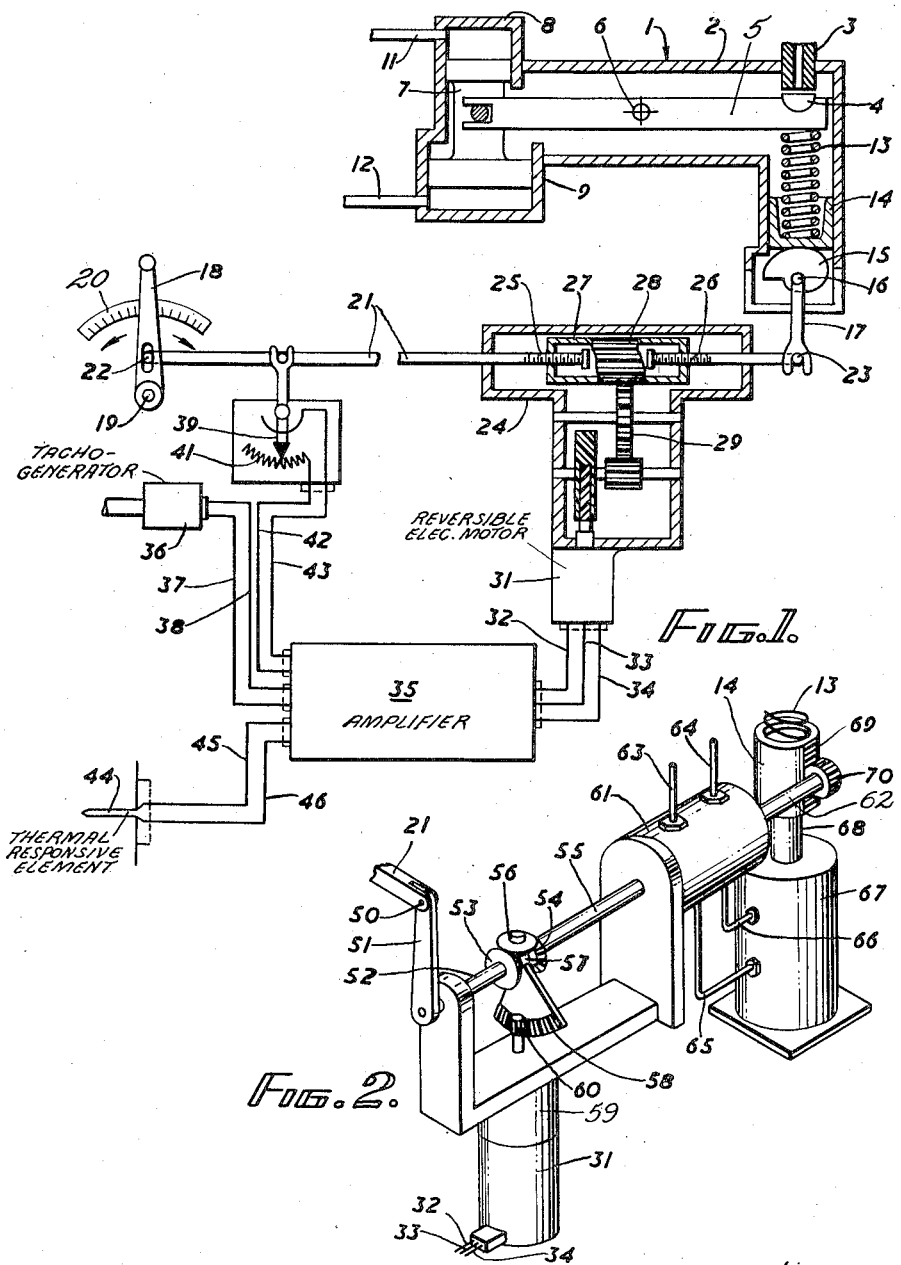
INVENTOR
FREDERICK HENRY CAREY
ATTORNEYS United States Patent Office 2,829,662
Patented Apr. 8, 1958

2,829,662

APPARATUS FOR REGULATING FUEL FLOW IN GAS TURBINE ENGINES

Frederick Henry Carey, Cheltenham, England, assignor to Dowty Fuel Systems Limited, Cheltenham, England Application September 6, 1955, Serial No. 532,492

Claims priority, application Great Britain September 3, 1954

5 Claims. (Cl. 137—36)

This invention relates to liquid fuel supply systems for gas turbine engines in which the rate of discharge of liquid fuel into the combustion chambers and hence the speed of the engine is servo controlled by governor mechanism comprising a servo vent and closure member which latter is loaded in the closing sense by a spring reacting between said closure member and an abutment movable under the direct or indirect control of a lever or equivalent mechanism which is hereinafter referred to as the "speed governor control element." In one form of governor mechanism, the speed governor control element mechanically determines the position of the spring abutment and the resulting variable spring loading on the closure member is opposed by a pressure signal which may be derived from the fuel flow and which varies substantially in accordance with engine speed for restoring equilibrium of the closure member at the governed speed. With this and other forms of governor mechanism, changing conditions, resulting for example when one fuel is replaced by another of different density, will influence the loadings on the vent closure member and thereby cause the engine speed to depart from the speed selected by the pilot's main control lever which is linked to the speed governor control element.

The object of the invention is to provide improved transmission mechanism for controlling the speed governor control element whereby the said changing conditions shall be accompanied by automatic compensation so that the relationship between engine speed and the setting of the pilot's main control lever shall be unaffected by these changes.

According to the invention, fuel system control apparatus for a gas turbine engine comprises transmission mechanism arranged for connection at one end with a manual control member and at its other end with a fuel flow governor control element, differential gearing in the transmission mechanism, said differential gearing having a movable differential member acting through the gearing upon the transmission mechanism to vary the co-ordination between the manual control member and the governor control element, engine speed selecting means connectively associated with the manual control member and operative to give a signal of selected speed, speed responsive means adapted to be driven by the engine and operative to give a signal of actual speed, and power operated means responsive to the selected speed signal and the actual speed signal, the power operated means being operatively connected to the differential member to move same in accordance with the difference between the selected speed signal and the engine speed signal, and in the sense required to vary said co-ordination for securing correspondence between the actual engine speed and the selected speed.

The invention is illustrated by way of example in Figures 1 and 2 as applied to a fuel supply system of the kind wherein the flow of fuel to return flow burners of a gas turbine engine is regulated by a throttle valve in the return line from the burners, and the throttle valve is servo-operated by means of a vent valve which is subject to a fluid pressure loading acting in the valve opening sense and a resilient loading acting in the valve closing sense.

In Figure 1, which is diagrammatic in form, an all-speed governor shown generally at 1 comprises a housing 2 having a vent pipe 3 fixed therein, and a hemispherical closure member 4 which together with the end of the vent pipe 3 forms the vent valve. The closure member 4 is carried at one end of a lever 5 which is supported intermediately on a pivot 6, and the other end of the lever is coupled to a differential piston 7 the ends of which work in cylinders 8 and 9. The cylinders 8 and 9 have pipe connections 11 and 12 respectively through which a fluid pressure signal of engine speed is applied to the differential piston 7 and hence to the lever 5, this fluid pressure signal acting to apply a vent opening load which increases with increasing engine speed.

The closure member 4 is loaded in the valve closing sense by a spring 13 which is interposed between the lever 5 and a plunger 14 which acts as a cam follower. A rotary cam 15 mounted on a pivot 16 in the housing 2 has a lever arm 17 fast therewith by which the cam 15 may be turned to vary the load of the spring 13 for varying the governed speed of the engine.

Since the load of the spring 13 acting on one end of the lever 5 is opposed by the pressure signal of engine speed applied by the differential piston 7 at the other end of the lever, the opposed loads will control the balance of the lever 5 for maintaining equilibrium of the closure member 4 at any governed speed of the engine.

A pilot's control lever 18 mounted on a pivot 19 has a connecting rod 21 pivoted thereto at 22 and the other end of the connecting rod is pivoted to the lever arm 17 at 23, this assembly thus constituting a primary control inasmuch as the closure member 4 will respond immediately to controlling movements of the lever 18. The connection between the pilot's control lever 18 and the arm 17 is for simplicity shown to be a purely mechanical one but it is to be understood that this connection may include an electrical remote control system and/or additional mechanical linkages transmitting either linear or rotary motion.

The object of the invention is to provide an unvarying correspondence between the angular setting of the pilot's lever 18, as may be indicated by a speed calibrated scale 20, and the governed speed, since the latter will tend to vary for a given angular position of the cam 15 under different engine-operating conditions such as may be brought about, for example, by the use of different fuels, or by operation of the engine at different altitudes.

The governed speed, in the case of a simple gas turbine engine, will be that of the shaft which carries the compressor and turbine rotors, while in the case of a two-spool engine, the invention may be used to control the rotational speed of the shaft which carries the low pressure compressor and turbine rotors. In accordance with the invention, the link 21 is divided and the divided ends are connected by a differentially variable link whose effective length is controlled in order to compensate for different engine-operating conditions, such as have been referred to, which would otherwise disturb the correspondence between the angular setting of the lever 18 and the governed speed of the engine.

The differential mechanism of the variable link is enclosed in a housing 24 into which the divided ends 25 and 26 of the link 21 pass co-axially. These ends 25 and 26 are formed with opposite-handed screw threads which engage with the opposite end portions of a cylindrical member 27. The outer surface of the cylindrical member, shown broken away in the drawing, is formed with longitudinally elongated gear teeth 28 which mesh with a gear pinion 29 mounted rotatably in the housing 24. Owing to the elongation of the gear teeth 28, the pinion 29 can remain in mesh with the cylindrical member 27 during axial displacement of the latter by the pilot's control lever 18 so that the pinion 29 can transmit rotation to the cylindrical member 27 for varying the effective length of the link 21 at any position of the control lever 18. The pinion 29 is driven through reduction gear by reversible electric motor 31 mounted on the casing 24.

The electric motor 31 is connected by three leads 32, 33 and 34 to an amplifier 35 which is arranged to be responsive to the speed of the engine and to the speed selected by the pilot. To this end, the engine shaft drives a tacho-generator 36 which feeds a voltage signal of engine speed through leads 37 and 38 to the amplifier 35. Further, a speed selector device is coupled to the link 21 and comprises a pivoted potentiometer arm 39 working over a resistance element 41 to vary the voltage across a pair of leads 42, 43 connected to the amplifier 35, this voltage varying in accordance with the angular setting of the pilot's control lever 18 against the speed calibrated scale 20, and constituting a signal of selected speed. The voltage in the leads 42, 43 of the speed selecting device is arranged to balance the voltage in the leads 37, 38 of the tacho-generator 36 when the engine speed coincides with the selected speed so that there is no voltage difference which can be amplified in the amplifier 35 to drive the motor 31.

If the engine speed due to a change in engine-operating conditions rises above the selected speed, the voltage signal in the leads 37, 38 from the tacho-generator will exceed that in the leads 42, 43 from the speed selecting potentiometer so that the difference will be amplified in the amplifier 35 and passed on through the leads 32, 33 to drive the electric motor in one direction with the effect of turning the cylindrical member 27 to increase the effective length of the link 21. This will turn the cam 15 to reduce the spring load on the closure member 4 and thus bring about a reduction in engine speed, and as engine speed falls the voltage signal from the tacho-generator 36 will fall correspondingly until equality is reached with the voltage signal in the leads 42, 43 at which the electric motor 31 will cut out.

If the engine speed falls below the selected speed, the voltage signal in the leads 37, 38 from the tacho-generator will fall below that in the leads 42, 43 from the speed-selecting potentiometer. The voltage difference will be amplified in the amplifier 35 and passed on through the leads 33, 34 to drive the electric motor 31 in the reverse direction with the effect of turning the cylindrical member 27 to decrease the effective length of the link 21. This will turn the cam 15 to increase the spring load on the closure member 4 and thus bring about an increase in engine speed. As the engine speed rises the voltage signal from the tacho-generator 36 will increase correspondingly until equality is reached with the voltage signal in the leads 42, 43 at which the electric motor 31 will cut out.

If a change in speed is selected by shifting the control lever 18 one way or the other, then the link 21 connected thereto acts through the lever 17, cam 15, piston 14, spring 13 and lever 5 to effect an immediate change in the loading of the closure member 4 against the vent 3. The latter mechanism constitutes a course primary control of engine-speed, and if this differs from the indicated selected speed, the signals from the potentiometer 41 and tachometer 36 will act in the manner described upon differential mechanism which is interposed in the link 21, to exert a fine secondary trimming control of engine speed after the primary control has taken effect.

A thermal responsive element 44 is situated in the tail-pipe of the engine and connected by leads 45, 46 to the amplifier wherein the voltage signal of temperature is amplified and arranged to operate the electric motor 31 for the purpose of increasing the effective length of the link 21 so as to bring about a reduction of fuel discharged by the burners should the temperature of the engine rise above the predetermined value.

In the drawing means have been shown for varying the effective length of a link which is movable to and fro in the direction of its length but it is to be understood that the invention is applicable to a rotary transmission between the pilot's control lever 18 and the cam 15 by the interposition of differential gearing, the floating component of which is arranged to be angularly movable by a reversible electric motor equivalent to that shown at 31.

The invention is applicable not only to a simple gas turbine engine having one turbine rotor and one compressor rotor mounted on a common shaft, but also to a compound or two-spool engine, the tacho-generator in the latter case being driven by the shaft which carries the low pressure turbine and compressor rotors.

Should the electrical apparatus which is operative upon the variable link fail for any reason the mechanical transmission, i. e. the link 21 in the example described, between the pilot's control lever 18 and the cam 15 will remain effective to enable the pilot to retain a course control over the speed of the engine, though without precise correspondence between the engine speed and the angular setting of the control lever 18.

Figure 2 illustrates a modification of Figure 1 wherein the mechanical transmission between the pilot's control lever 18 and link 21 to the spring plunger 14 includes a rotary transmission having a geared differential therein for applying the speed correction. In the drawing the link 21 is pin jointed at 50 to a lever arm 51 which is fast on a first shaft 52. The other end of the lever arm carries a bevel gear 53 and opposite this a like bevel gear 54 is carried on a second shaft 55 which is co-axial with the first. An intermediate bevel gear 56 meshing with both the gears 53 and 54 is rotatively mounted on a rocker 57 which is free to turn about the axis of the shafts 52 and 55, while opposite the gear 56, the rocker 57 is formed with a quadrant having an arcuate rack 58 at its periphery.

The reversible motor 31 which is fed with current from the amplifier 35 is fixed to a reduction gear box shown generally at 59 out of which projects a shaft carrying a gear pinion 60 meshing with the gear rack 58.

The second shaft 55 enters a rotary servo valve of known type which is shown generally at 61, and at the opposite end of the valve a rotary follow-up shaft 62 enters the valve 61 to co-operate with the valve component carried by the shaft 55 in controlling the direction and flow of hydraulic fluid through the valve 61. Pressure and return pipes 63 and 64 attached to the valve are adapted to be connected to sources of high and low pressure, while service pipes 65 and 66 are connected between the rotary servo valve 61 and a double-acting jack which is shown generally at 67. The piston rod 68 of the double-acting jack carries the plunger 14 of the governor 1 whereby the spring 13 therein is compressible by hydraulic power applied by the jack 67 for controlling the all-speed governor 1. In this case, however, the plunger 14 has a toothed rack 69 formed along one side and this is engaged by a gear pinion 70 which is fast on the outer end of the follow-up shaft 62.

The second shaft 55, the follow-up shaft 62, the rotary servo valve 61, and the jack 67 comprise a known servo-operated system wherein any relative angular displacement between the second shaft 55 and follow-up shaft 62 operates the valve 61 so that fluid flow in the service pipes 65 and 66 to the jacks 67 takes place in a direction always to restore the follow-up shaft 62 to a position of angular correspondence with the second shaft 55. Thus a positional relationship will always be maintained between the plunger 14 and the second shaft 55 as if the two shafts 55 and 62 were one, though the operation of the plunger 14 by the jack 67 ensures that there is no feed back of the load of the spring 13 to give a torsional bias on the second shaft 55.

In operation, clockwise movement of the pilot's control lever 18 acting through the link 21 and lever 51 will cause clockwise rotation of the shaft 52 and thus anti-clockwise rotation of the second shaft 55. Consequently the jack 67 will lower the plunger 14 to relax the load of the spring 13 so that it will be evident that the mechanism of Figure 2 operates in the same manner as Figure 1 to transmit controlling movement from the pilot's lever 18 to the spring 13. Whereas the electric motor 31, in Figure 1, is controlled to vary the effective length of the link 21, the electric motor 31 of Figure 2 will operate in a similar manner upon receipt of an amplified signal of the difference between the actual engine speed and selected speed to vary the opposite angular displacement of the first shaft 52 and the second shaft 55 with effect to restore correspondence between the actual speed and the selected speed of the engine.

I claim as my invention:

1. Fuel system control apparatus for a gas turbine engine comprising a manual speed control member movable to positions each of which corresponds to a selected speed, a fuel flow governor including a control element movable to vary the fuel flow to the engine, transmission mechanism connecting the speed control member to the control element, said member, element and transmission together constituting a primary control of fuel flow, a differential device operatively interposed in the transmission mechanism, said differential device having a movable differential member acting to vary the co-ordination between the manual control member and the governor control element, engine speed selecting means connectively associated with the manual control member and operative to give a signal of selected speed, speed responsive means adapted to be driven by the engine and operative to give a signal of actual speed, and power operated means responsive to the selected speed signal and the actual speed signal, the power operated means being operatively connected to the differential member to move same in accordance with the difference between the selected speed signal and the engine speed signal, and in the sense required to vary said co-ordination for securing correspondence between the actual engine speed and the selected speed.

2. Fuel system control apparatus according to claim 1, wherein the transmission mechanism includes a link and the differential gearing comprises a screw and nut differential device which is operative to vary the effective length of the link.

3. Fuel system control apparatus according to claim 1, wherein the transmission mechanism includes a rotative coupling and the differential gearing comprises a gear wheel differential device which is operative to vary the relative angular disposition of the coupling parts.

4. Fuel system control apparatus according to claim 3, including a fluid pressure jack connected to the governor control element, and a rotary servo valve interposed between the transmission output and the governor control element, the rotary servo valve controlling the fluid pressure jack to secure co-ordination of movement between the transmission output and the governor control element.

5. Fuel system control apparatus for a gas turbine engine comprising a fuel flow governor including a control element movable to vary the fuel flow to the engine, a speed control member settable at will into positions each of which corresponds to a selected engine speed, means interconnecting said speed control member and said control element for movement of the latter in accordance with the setting of the former, differential means incorporated in said interconnecting means to shift the control element relative to the settable speed control member at the latter's attained setting, and so to vary the coordination between the two engine speed selecting means operatively connected to the speed control member and operative to give a signal characteristic of the attained setting thereof, speed responsive means adapted to be driven by the engine and operative to give a signal characteristic of the actual speed of the engine, and means to integrate the two signals, and operative in response to a differential therebetween, said integrating means being operatively connected to said differential means to move the latter in accordance with any signal difference, in the sense required to vary the coordination between the control element and the speed control member, and to restore the signal difference to zero.

References Cited in the file of this patent

UNITED STATES PATENTS

| | | |
|---|---|---|
| 2,559,938 | Carey | July 10, 1951 |
| 2,640,550 | Knapp et al. | June 2, 1953 |
| 2,664,959 | Stuart | Jan. 5, 1954 |
| 2,720,751 | Kunz | Oct. 18, 1955 |